May 22, 1951  R. ADLER  2,553,734
POWER LINE SIGNAL PICKUP
Filed Dec. 21, 1945

ROBERT ADLER
INVENTOR.

BY David M. Davis
HIS ATTORNEY

Patented May 22, 1951

2,553,734

UNITED STATES PATENT OFFICE 2,553,734

POWER LINE SIGNAL PICKUP

Robert Adler, Chicago, Ill., assignor to Zenith Radio Corporation, a corporation of Illinois Application December 21, 1945, Serial No. 636,464

3 Claims. (Cl. 250—16)

This invention relates to radio receivers, and more particularly to such receivers with which no antenna other than a mains power line is connected.

It has long been known that radio frequency signals exist on mains power lines, for example, on the electric conductors connected with the wiring plugs and sockets in a home. Advantage has been taken of this fact by connecting the input terminals of said radio receivers to such mains power line through condensers small enough to isolate the radio receiver from the low frequency power current flowing in the mains power line.

It has more recently been found that high frequency radio energy exists between the two conductors of a mains power line, as described in United States Letters Patent No. 2,310,896, issued February 9, 1943, to Gilbert E. Gustafson and assigned to the same assignee as the present application. In that patent, one arrangement is described and claimed for deriving such high frequency energy from such a mains power line for use in a high frequency radio receiver.

There is a great variety of wire sizes, of types of conducting or insulating conduits and of switches, fuse boxes, meters, plugs and sockets which exist in buildings in which radio receivers are to be used. Consequently the magnitude and phase angle of the impedance between the two conductors of such a mains power line, or between one or both of those conductors and ground or metal bodies such as a radio receiver chassis, may be found at any particular mains power outlet, to lie anywhere within a relatively wide range. For example, where the two conductors of the mains power line are covered with insulation which is relatively poor for high frequency signals and are surrounded by a metallic sheath or conduit, the leakage between those conductors for high frequency current is substantial, and the impedance of the power outlet may have a resistance component of only a few ohms. Alternatively, in structures in which the power wiring was installed many years ago, and in which the two conductors of the mains power line are close to each other only at an outlet plug and extend through walls and ceilings on stand-off insulators spaced one or two feet apart, the resistive component of the impedance between the two conductors at the outlet may be relatively large, in the order of several hundred ohms. In such case, the power line cord and power transformer primary of the radio receiver itself contribute the major part to the impedance at radio frequencies which exists between the conductors of the power line.

In similar fashion, the reactive component of the impedance between two such conductors may be found to lie between wide limits. The inductive component is usually small, while the capacitive component may be relatively small in the case of old power lines spaced a foot or two apart, but may be relatively large where the two power conductors extend very close together through a metal sheath or conduit. In fact, the capacitive component may, for example, in such case be as much as several hundred micromicrofarads.

When an arrangement, such as is described and claimed in the aforementioned patent, is used to transfer radio frequency signals from such power line conductors to the input terminals of a radio receiver, ample signal strength is impressed on the receiver from most of the mains power outlets within a radius of some miles of the transmitting station, and from many of the mains power outlets throughout a still greater area. In some cases, where insufficient signal strength is transferred by the aforementioned patented arrangement, the reason is that an extremely small amount of signal energy exists between the two conductors of the mains power line. On many others of the outlets where the arrangements shown specifically and claimed specifically in the patent do not transfer sufficient signal energy such energy does exist between the two conductors of the mains power line or between one or both of those conductors and ground or the chassis of the radio receiver, but the transfer of that signal energy into the radio receiver is not sufficiently efficient to make proper use of it.

It is therefore a principal object of this invention to provide an arrangement for transferring high frequency signal energy from the mains power line into a radio receiver with greater efficiency under conditions under which known arrangements are not entirely satisfactory.

It is also an object of this invention to provide such an arrangement in which very large changes in the phase angle or magnitude of impedance between the two conductors of the mains power line or between one or both of those conductors and ground or the radio receiver chassis do not appreciably reduce the efficiency of radio frequency signal transfer into the radio receiver.

The features of the present invention which are believed to be novel are set forth with particularity in the appended claims. The present invention itself, both as to its organization and manner of operation, together with further objects and advantages thereof may best be understood by reference to the following description taken in connection with accompanying drawings in which:

Figure 1:
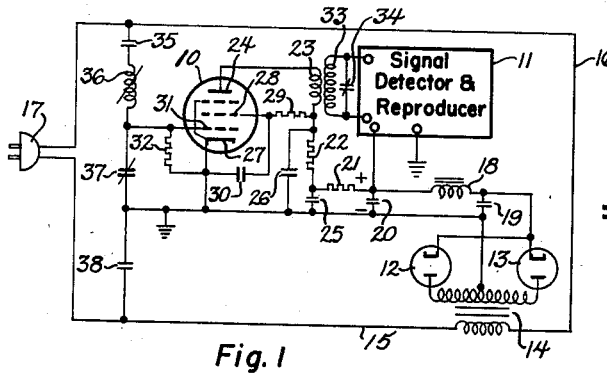
Figures 1 through 4 illustrate schematically various circuit arrangements incorporating the invention.

In Figure 1, a radio receiver, illustrated schematically, includes a radio frequency amplifier device 10, a rectangle 11 representative of a signal detector and reproducer and two rectifier discharge devices 12 and 13 to supply rectifier discharge current to the device 10 and reproducer 11 from a transformer 14 whose primary terminals are connected respectively with conductors 15 and 16. A power plug 17, of the type commonly used in connection with mains power outlets, is connected with the two conductors 15 and 16 to supply power frequency current to the transformer 14.

Rectified power frequency current from the transformer 14 is supplied in conventional fashion through a filter including a choke 18 and smoothing condensers 19 and 20, to the reproducer 11. Rectified and smoothed current from the smoothing condenser 20 is also supplied to the device 10, one terminal of condenser 20 being grounded and its other, positive, being connected serially through resistances 21 and 22 and the primary 23 of a high frequency transformer to the anode 24 of the device 10. A by-pass condenser 25 is connected between ground and the point between resistances 21 and 22 for further smoothing, and similarly a by-pass condenser 26 is connected between ground and a point between resistance 22 and primary 23, for the same purpose. The cathode 27 of device 10 is grounded, and the screen electrode 28 is connected through a resistance 29 to a point between resistance 22 and primary 23 for the supply of discharge current to the screen electrode 28. A by-pass condenser 30 is connected between cathode 27 and screen electrode 28 to maintain the potential of screen electrode 28 invariant at signal frequencies with respect to cathode 27.

Signal voltage which exists between the conductors 15 and 16, and which is impressed between the control electrode 31 and cathode 27 of device 10, between which grid leak resistance 32 is connected, are amplified in device 10 and appear across the primary 23 of the high frequency transformer, whose secondary 33 is tuned to resonance with such signal voltage by condenser 34, the secondary 33 being connected to the input terminals of the signal detector and reproducer 11.

As pointed out previously, it is quite usual in modern mains power systems that, for high frequency radio currents, the impedance between the power conductors of such a mains power system is relatively small. Therefore, in order to provide efficient signal power transfer from the conductors 15 and 16 to the device 10, a low impedance signal transfer network is connected between the conductors 15 and 16. This network includes serially in the named order, a large coupling condenser 35, a tuning inductance 36, a tuning condenser 37, and a large coupling condenser 38, all connected between conductors 15 and 16. A point between condensers 37 and 38 is connected to the grounded cathode 27, and a point between the inductance 36 and the condenser 37 is connected to the control electrode 31 of device 10.

Condensers 35 and 38 have negligible reactance at the signal frequencies under consideration and the inductance 36 is series resonant with the condenser 37 and the capacity in the power line at that signal frequency, so as to present a low impedance path for the flow of signal current between conductors 15 and 16 through the tuning condenser 37. In order to obtain maximum power transfer for such high frequency signals from the conductors 15 and 16 into the electrical path formed by inductance 36 and condenser 37, the resistance component of that path, which appears almost entirely in the inductance 36, should be substantially equal to the equivalent resistance considered as in series with the capacitance existing between conductors 15 and 16 in the absence of the path 35, 36, 37, 38. This equivalent series resistance between the conductors 15 and 16 is in many cases rather small, especially in modern power wiring systems, and for maximum power transfer the resistance of coil 36 should be of the same order.

There is, however, a substantial influence upon the resonant frequency of the network 35, 36, 37, 38, by differences in the reactive component of impedance between conductors 15 and 16 found between various situations. If the inductance 36 and condenser 37 are made to resonate at the same frequency as secondary 33 and condenser 34 in the presence of average conditions of reactive impedance between conductors 15 and 16, the substantial differences in that reactive component of impedance across those conductors between various locations is sufficient seriously to mistune the path 35, 36, 37, 38 in many situations. In order to minimize that mistuning, it is one of the principles of this invention deliberately to provide a mismatch between the resistive components of the path 35, 36, 37, 38 and the equivalent series resistance between the conductors 15 and 16 in such a manner that the resistance of the coil 36 is substantially larger than that necessary for maximum power transfer.

As an example, the resistance of coil 36 may be made as much as four times the equivalent series resistance between conductors 15 and 16 at signal frequencies, with the result that the power transfer is 64% of the maximum possible and with the very desirable result that mistuning is reduced by four times with a corresponding very large increase in signal transfer which in many if not most cases more than offsets the relatively small reduction in power transfer caused by the deliberate mismatch in the resistive components.

In order to maintain the required selectivity, this increase in resistance of coil 36 is achieved by increase in its inductance with the quality factor kept about constant, and there is a simultaneous increase in reactance of condenser 37 to maintain the resonant frequency constant. Of course, also it is assumed that the capacity between conductors 15 and 16 in the absence of path 35, 36, 37, 38, is substantial and in fact is many times larger than the capacity 37.

Figure 2:
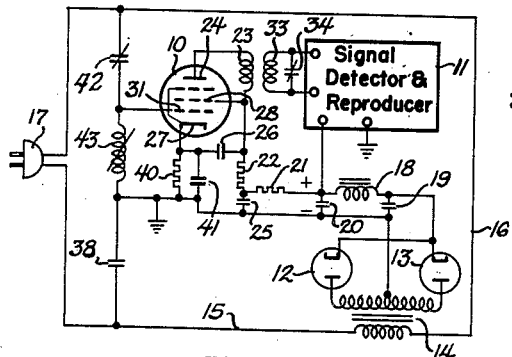

In Figure 2, many of the elements illustrated are identical with those illustrated in Figure 1, and are designated by like reference characters.

However, the cathode 27 is connected through a biasing resistance 40 connected in shunt with a by-pass condenser 41 to ground, and the smoothing condenser 26 is connected between cathode 27 and a point between resistance 22 and the primary 23 of the signal frequency transformer. Also, screen electrode 28 is connected directly to a point between resistance 22 and primary 23, the screen dropping resistance 29 and by-pass condenser 30 being entirely omitted.

Instead of the path 35, 36, 37, 38, as was used in the arrangement of Figure 1, a low impedance path including in the order named a tuning condenser 42 and a tuning inductance 43 and the large coupling condenser 38 is connected between conductors 15 and 16. A point between the coupling condenser 38 and the inductance 43 is connected to ground and the point between tuning condenser 42 and tuning inductance 43 is connected to the control electrode 31, the grid leak resistance 32 being omitted entirely.

The operating principles of this arrangement are substantially identical with those described in connection with Figure 1. For maximum power transfer of signals from conductors 15 and 16 to the device 10 the resistance of coil 43 would be made equal to the equivalent series resistive component of impedance between the conductors 15 and 16, but in accordance with the invention is made substantially larger (along with the increase of the coil inductance as described) so that variations in the reactive component of impedance between conductors 15 and 16 do not appreciably affect the tuning of condenser 42 and inductance 43.

While it has been so far assumed that substantial capacity exists between conductors 15 and 16, many times larger than that of the tuning condensers 37 or 42, there are situations where capacity between conductors 15 and 16 is relatively small. There the equivalent series resistance between conductors 15 and 16 appears relatively large and a simple low impedance path provided between conductors 15 and 16 cannot be designed with sufficiently high resistance. In such cases, as well as in cases where the arrangements of Figures 1 and 2 are useful, the following improved arrangement is highly desirable.

Figure 3:
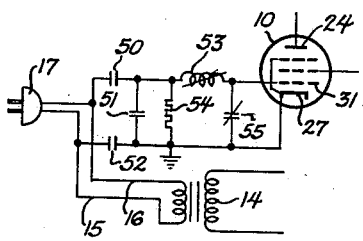

In Figure 3, and in the remaining figures, only certain parts in which alterations are made, have been illustrated, it being understood that the parts not illustrated are like those shown in Figures 1 and 2. Certain of the parts in those figures are identical with those illustrated in Figures 1 and 2, and like reference characters are applied to them.

In Figure 3, the network has, in the order named, a large coupling condenser 50, a condenser 51, and a large coupling condenser 52 connected in series directly between conductors 15 and 16. The reactances of condensers 50 and 52 are negligible at the signal frequencies involved, and the reactance of condenser 51 is substantial, although small, and may be determined as described hereinafter in connection with Figures 7 and 8. The grounded cathode 27 of the device 10 is connected to a point between condensers 51 and 52, and the control electrode 31 is connected serially through a tuning inductance 53 and the grid leak resistance 54 to ground. The resistance 54 is connected in shunt with the condenser 51 and a tuning condenser 55 is connected between control electrode 31 and cathode 27.

Since the resistance 54 is large in comparison to the reactances of elements 51, 53 and 55, the tuned circuit may be regarded as formed by the inductance 53, the condenser 55 and the condenser 51 in shunt with the impedance between conductors 15 and 16. The reactance of condenser 51 is small with respect to the reactance of inductance 53 or condenser 55.

Figure 4:
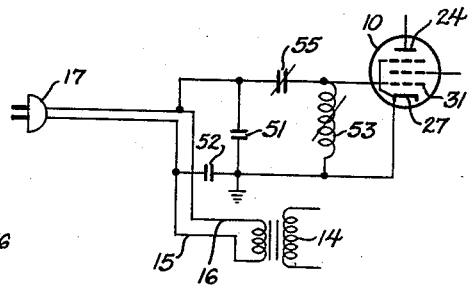

Figure 4 is very similar to Figure 3 except that coupling condenser 50 and grid leak resistance 54 are omitted, inductance 53 is connected between control electrode 31 and cathode 27, and tuning condenser 55 is connected between control electrode 31 and the junction of condenser 51 and the power line 16.

It is to be understood, of course, that in operation, the plug 17 must be inserted in an outlet to the mains power line, both for the purpose of supplying operating energy to the receiver and for the purpose of picking up the radio-frequency signals appearing on the mains power line.

Figure 5:
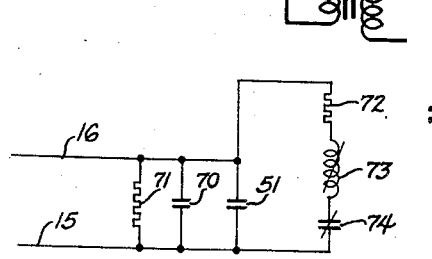

In Figure 5 there is illustrated a circuit which is the electrical equivalent of the circuits illustrated in Figures 1 through 4, it being assumed that the plug 17 is inserted in an outlet to the mains power line (not shown). Condenser 70, connected between conductors 15 and 16, represents the capacitive component of impedance which exists between the conductors 15 and 16 of the mains power line to which the plug 17 is connected. Resistance 71 represents the leakage component of impedance in like fashion between conductors 15 and 16.

It is assumed for purposes of simplicity that inductive components of impedance between conductors 15 and 16 are negligible or are much more than offset by capacitive components of that impedance, as represented by condenser 70.

Condenser 51 is the capacity of relatively low reactance which is connected as in Figures 3 and 4 between conductors 15 and 16. Where no condenser 51 is used, as in Figures 1 and 2, condenser 51 in Figure 5 may be regarded as of zero capacity, all capacity for the purpose of the invention being provided by condenser 70. In shunt with these condensers 51 and 70 there is connected an electrical path including a series resistance 72, inductance 73, and a condenser 74. The inductance 73 and the condenser 74 respectively represent tuning reactances in the groups 36, 37; 43, 42; 53, 55 while resistance 72 represents the damping inevitably associated with these reactances.

Figure 6:
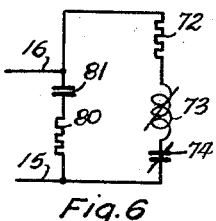
Figures 5 and 6 are simplified schematic circuit diagrams useful in illustrating a principle of the invention.

For greater ease in analysis and explanation of the principles of this invention, for any particular signal frequency the network illustrated in Figure 5 may be rearranged as an electrically equivalent network such as illustrated in Figure 6.

In Figure 6 a resistance 80 and a condenser 81 are connected serially between conductors 15 and 16, and, at a particular signal frequency or in a small band of signal frequencies, may be given such magnitudes as to act electrically in the same fashion as the elements 51, 70 and 71 of Figure 5, as explained hereafter. Also, in Figure 6, the resistance 72, inductance 73 and condenser 74 are connected serially between conductors 15 and 16, as they were in Figure 5.

Since condensers 51 and 70 in Figure 5 are in parallel with one another, they may be regarded as a single capacity, the reactance of which is hereafter designated as X, and resistance 71 is hereafter designated as R. Resistance 80 of Figure 6 is designated as $r$, and the reactance of condenser 81 in Figure 6 as $x$. It may be shown by well known methods that the network 80, 81 of Figure 6 is the precise electrical equivalent of the network 51, 70, 71 of Figure 5, if the following relations are observed:

$$r = \frac{RX^2}{R^2+X^2} \quad (1)$$

$$x = \frac{R^2X}{R^2+X^2} \quad (2)$$

$$X = R\sqrt{\frac{r}{R-r}} \quad (3)$$

In the light of this equivalent circuit, the principles of this invention can best be understood by reference to a particular example. For the purpose of that example it may be assumed that R equals 75 ohms in the typical case, and it is desired to determine what should be the magnitude of condenser 51. To begin with, it will be assumed that there exists a capacity of 200 micromicrofarads across the line; the effects of varying this capacity will then later be shown. It will be first shown how the arrangement should be designed for maximum power transfer, and what are the effects upon that circuit of changing capacity 70, it being thereafter shown how the circuit should be designed in accordance with the invention.

To obtain the maximum possible power transfer $r$, representing resistance 80, should equal resistance 72. In order to obtain a minimum effect upon tuning of changes in R and X, $x$ must be much smaller than the reactance of condenser 74 or the reactance of inductance 73.

Proceeding with those considerations in mind and assuming for the purpose of this example, that the signal frequency under consideration is about 50 megacycles and that it is desired to use an inductance coil 73 whose inductive reactance is 150 ohms at 50 megacycles and whose quality factor is 50, it is apparent that the resistance 72 of the coil 73 is 3 ohms.

Therefore $r$ equals 3 ohms and by the use of Equations 3 and 2 it follows that approximately $X=x=15$ ohms.

It will be noted that, whenever $x$ is much smaller than the reactance of inductance 73 or condenser 74, $x$ will be very nearly equal to X. In consequence, since the reactance of inductance 73 is 150 ohms at 50 megacycles, and that of capacity 81 is about 15 ohms, the reactance of condenser 74 is about 135 ohms at 50 megacycles. Since 15 ohms at 50 megacycles is the reactance of 200 micromicrofarads of capacity, the capacity of the line itself suffices and condenser 51 is not needed.

Now assume that the mains power line for one reason or another, such as change in location, or switching in the power line or connection of different appliances to it, is subject to some variation in capacity between conductors 15 and 16. Assume for the purposes of the example that there is an increase in capacity of 200 micromicrofarads. After that change the reactance of the increased capacity between lines 15 and 16 is 7½ ohms, with a consequent change of about 5% in the net capacitive reactance of the entire tuned circuit 73, 74, 81, of Figure 6. In consequence there would be about 2½% change in the resonant frequency of that circuit, and a consequent reduction in sensitivity of about 3 times. In other words, this change in capacity of 200 micromicrofarads between the conductors 15 and 16 would reduce the signal voltage appearing across inductance 73 or across condenser 74 to about one-third of its magnitude before the addition of the 200 micromicrofarad capacity.

Turning now to an examination of the example described to find the effect of a deliberate mismatch, let a condenser 51 of 200 micromicrofarads be connected across conductors 15 and 16, which have before such connection 200 micromicrofarads of capacity therebetween. Then the total reactance between lines 15 and 16 is 7½ ohms. Then by the use of Equation 1, $r=¾$ ohm.

In order to tune the circuit properly with such elements, the reactance of condenser 74 should be 142.5 ohms. The radio frequency current through condenser 74 or inductance 73 is only 80% as much as with perfect matching, as is well known.

Now, if the power line is subject to an increase of 200 micromicrofarads in capacity between conductors 15 and 16, such a change would cause a decrease of about 33% in the reactance of capacity 81, and about 1.6% decrease in the capacitive reactance of the entire tuned circuit 73, 74, 81, with a consequent approximate three-quarters percent change in resonant frequency, which would produce a further reduction in sensitivity of about 17%, which still leaves the arrangement much more sensitive than the arrangement of Figure 5 without condenser 51 where line capacity is subject to the described increase.

It has been found that these relations may be viewed in a rather simple manner, and that there is an optimum size for condenser 51, taking into account the probable deviation of line capacity from a median. It is preferred that a condenser, such as condenser 51, be connected between conductors 15 and 16 and be of such size that the resultant probable deviation from the median total capacitive reactance (including that of condenser 51) caused by differing line capacity at various locations is approximately equal to the loss resistance 72 in the tuned circuit. If that be done, satisfactory power transfer between the power line and the radio frequency energy translating device is obtained in the maximum number of locations.

Figure 7:
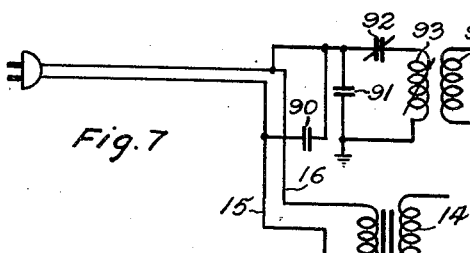
Figures 7 and 8 illustrate schematically other circuit arrangements incorporating the invention.

In Figure 7 there is illustrated a rather different circuit using these described principles. In this circuit arrangement, high frequency signal voltage which exists between the chassis of the radio receiver, illustrated as ground, and the two conductors 15 and 16 taken together, is utilized. A condenser 90 is connected directly between these two conductors 15 and 16, and its reactance at signal frequency is negligible. A condenser 91 is connected between conductor 16 and ground, or the chassis of the radio receiver, and this condenser 91 corresponds to condenser 51 in Figures 3, 4 and 5. It is this condenser 91 which is adjusted in accordance with this invention to produce a deliberate mismatch in resistance components of the power line 15, 16, and of the tuned circuit coupled with condenser 91 to achieve the desirable results possible with this invention. A tuning condenser 92 and a tuning inductance 93 are connected in series with the terminals of condenser 91 and are designed in the same manner, together with condenser 91 as set forth in connection with Figures 5 and 6. An inductance 94 is coupled with inductance 93 and is tuned to resonate with the signal by a tuning condenser 95 connected in shunt with inductance 94 between control electrode 31 and cathode 27 of device 10. Such an arrangement provides two tuned circuits between the device 10 and the power line from which signals are derived, where that much preselection is desired, and also makes it possible to design the circuit 91, 92, 93 with somewhat less consideration for the characteristics of the device 10.

Figure 8:
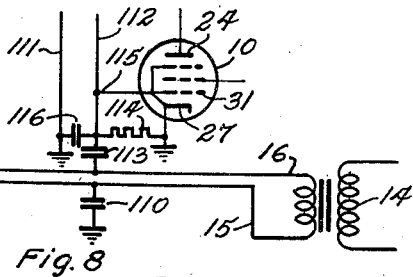

In Figure 8 an arrangement is illustrated in which the principles of the invention are applied to an ultra high frequency receiver in which resonant transmission lines replace tuned circuits having lumped reactances. In this arrangement, a large coupling condenser 110 having negligible reactance at the signal frequency involved is connected between conductor 15 and ground. A quarter wave transmission line having two conductors 111 and 112 is arranged with one terminal of conductor 111 connected to ground and the adjacent terminal of conductor 112 coupled to conductor 16 through a condenser 113 having a reactance negligible at the signal frequency involved. A condenser 116 of small though substantial reactance at the signal frequency is connected between the lower terminals of lines 111, 112. The transmission lines 111 and 112 presents at the signal frequency inductive and capacitive reactance in series at the end across which condenser 116 is connected. The terminal of conductor 112 to which condenser 113 is connected is also connected through grid leak resistance 114 to the grounded cathode 27 of device 10 and a tap 115 between the ends of conductor 112 is coupled to control electrode 31 of device 10.

In this arrangement, the design considerations are fundamentally the same as those set forth in connection with Figures 5 and 6, it being necessary only that condenser 116 be made sufficiently large that the deliberate desired mismatch is obtained. Having a condenser 116 of the desired magnitude, the transmission line 111, 112, is made of proper length to resonate with condenser 116 and the median line reactance at the desired signal frequency, and the tap 115 is adjusted to excite device 10 in proper fashion.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A signal receiving system comprising: means for translating radio-frequency energy; a pair of wire conductors, adapted to be connected to a mains power line to energize said translating means, providing at least one of two points between which two points appreciable admittance including conductance and susceptance components may be introduced, and between which two points radio-frequency signals may be applied, by connecting said conductors to said power line; a series circuit for coupling said signals to said translating means comprising an inductive reactance and a capacitive reactance coupled between said points and tuned to provide a low impedance comprising a predetermined resistive component at said radio-frequency; and a condenser connected between said points and having a reactance at said radio-frequency less than said capacitive reactance and greater than said resistive component.

2. A signalling system for receiving very-high frequency, frequency modulated signals comprising: means for translating very-high frequency energy; a pair of wire conductors, adapted to be connected to a mains power line to energize said translating means, providing at least one of two points between which two points appreciable admittance including conductance and susceptance components may be introduced, and between which two points said very-high frequency signals may be applied, by connecting said conductors to said power line; a series circuit for coupling said waves to said translating means comprising an inductive reactance and a capacitive reactance coupled between said points and tuned to provide a low impedance comprising a predetermined resistive component at said very-high frequency; and a condenser connected between said points and having a reactance at said very-high frequency less than said capacitive reactance and greater than said resistive component.

3. A signalling system for receiving very-high frequency, frequency modulated signals comprising: means for translating very-high frequency energy; a pair of wire conductors, adapted to be connected to a mains power line to energize said translating means, between which conductors appreciable admittance including conductance and susceptance components may be introduced, and between which conductors said very-high frequency signals may be applied, by connecting said conductors to said power line; a series circuit for coupling said signals to said translating means comprising an inductive reactance and a capacitive reactance coupled between said conductors and tuned to provide a low impedance comprising a predetermined resistive component at said very-high frequency; and a condenser connected between said conductors and having a reactance at said very-high frequency less than said capacitive reactance and greater than said resistive component.

ROBERT ADLER.

REFERENCES CITED

The following references are of record in the file of this patent:

UNITED STATES PATENTS

| Number | Name | Date |
|---|---|---|
| 1,717,701 | Dubilier | June 18, 1929 |
| 2,142,874 | Sadowsky | Jan. 3, 1939 |
| 2,143,563 | Levey et al. | Jan. 10, 1939 |
| 2,239,772 | Beizer | Apr. 29, 1941 |
| 2,350,668 | Baughmann | June 6, 1944 |

OTHER REFERENCES

The A. R. R. L. (American Radio Relay League) Antenna Book, page 140, 1942 edition (identical with 1947 edition).